US012374821B2

(12) United States Patent
Li et al.

(10) Patent No.: US 12,374,821 B2
(45) Date of Patent: Jul. 29, 2025

(54) ELECTRICAL CONNECTOR HAVING IMPROVED TERMINAL FITTING

(71) Applicant: Tyco Electronics (Shanghai) Co. Ltd., Shanghai (CN)

(72) Inventors: Qianjin (Orando) Li, Shanghai (CN); Xinquan (Jone) Ji, Shanghai (CN); YuQiang (Thomas) Zhao, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 412 days.

(21) Appl. No.: 17/975,933

(22) Filed: Oct. 28, 2022

(65) Prior Publication Data

US 2023/0140195 A1 May 4, 2023

(30) Foreign Application Priority Data

Oct. 29, 2021 (CN) ......................... 202122636057.9

(51) Int. Cl.

| | |
|---|---|
| ***H01R 13/42*** | (2006.01) |
| ***H01R 13/26*** | (2006.01) |
| ***H01R 13/428*** | (2006.01) |
| ***H01R 13/50*** | (2006.01) |
| *H01R 103/00* | (2006.01) |

(52) U.S. Cl.
CPC ........... *H01R 13/428* (2013.01); *H01R 13/26* (2013.01); *H01R 13/50* (2013.01); *H01R 2103/00* (2013.01)

(58) Field of Classification Search
CPC ....... H01R 13/428; H01R 13/26; H01R 13/50
USPC .......................................................... 439/660
See application file for complete search history.

(56) References Cited

U.S. PATENT DOCUMENTS

2022/0006213 A1* 1/2022 Moll ...................... H01R 4/182
2022/0337001 A1* 10/2022 Hetrick ................ H01R 12/613

* cited by examiner

*Primary Examiner* — Phuong K Dinh
(74) *Attorney, Agent, or Firm* — Barley Snyder

(57) ABSTRACT

A connector includes an insulation body having a first side surface and a second side surface adjacent with each other at a corner, a buckle protrusion on the first side surface, and a notch portion at the corner. The connector includes a conductive terminal partially pressed against the second side surface of the insulation body and an engagement member having a main body and a wing. The main body is disposed on the second side surface. The wing extends from the main body in a first direction in which the main body faces the second side surface. The wing has a buckle opening interference fitted with the buckle protrusion. The engagement member presses the conductive terminal partially against the second side surface and the notch portion is covered by a portion of the engagement member between the main body and the wing.

20 Claims, 3 Drawing Sheets

ELECTRICAL CONNECTOR HAVING IMPROVED TERMINAL FITTING

CROSS-REFERENCE TO RELATED APPLICATION

This application claims the benefit of the filing date under 35 U.S.C. § 119(a)-(d) of Chinese Patent Application No. 202122636057.9, filed on Oct. 29, 2021.

FIELD OF THE INVENTION

The disclosure generally relates to an electrical connector.

BACKGROUND

A fitting between a conductive terminal and an insulation body of a connector at a buckle is generally a transition fitting or a clearance fitting, and a gap at the buckle depends on machining sizes and accuracy of parts of the connector. A portion of the conductive terminal engaged with the insulation body is often movable relative to the insulation body, and thus mechanical properties of the connector itself are disturbed by movement resulting from the clearance fitting between the conductive terminal and the insulation body.

SUMMARY

A connector includes an insulation body having a first side surface and a second side surface adjacent with each other at a corner, a buckle protrusion on the first side surface, and a notch portion at the corner. The connector includes a conductive terminal partially pressed against the second side surface of the insulation body and an engagement member having a main body and a wing. The main body is disposed on the second side surface. The wing extends from the main body in a first direction in which the main body faces the second side surface. The wing has a buckle opening interference fitted with the buckle protrusion. The engagement member presses the conductive terminal partially against the second side surface and the notch portion is covered by a portion of the engagement member between the main body and the wing.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
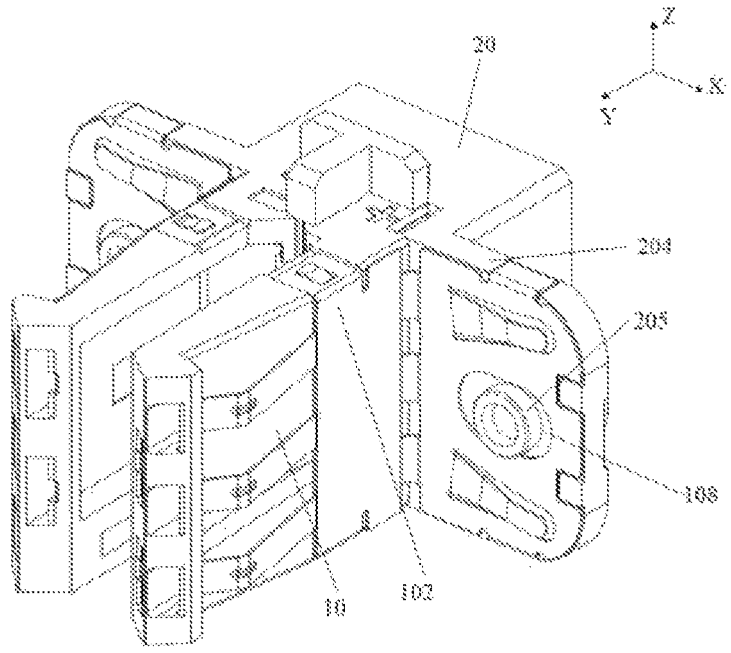
FIG. 1 is a perspective view of a connector according to an embodiment.

Hereinafter, embodiments of the disclosure will be described with reference to the accompanying drawings. The same reference numerals and symbols shown in the drawings of the disclosure refer to elements or components performing substantially the same function.

The terminology used herein is intended to describe the embodiments, and is not intended to limit and/or constrain the disclosure. The singular forms “a”, “an”, “the” and “said” are intended to include the plural forms as well, unless the context clearly dictates otherwise. In the disclosure, the terms such as “include”, “comprise”, “have” and the like, are intended to specify the presence of stated features, number, steps, operations, elements, components and combinations thereof, but do not preclude the presence or addition of one or more other features, number, steps, operations, elements, components and combinations thereof.

Although the terms such as “first”, “second” and the like are used herein to describe various elements, these elements should not be limited by these terms. These terms are only intended to distinguish one element from another. For example, a first element could be termed a second element, and a second element could be termed a first element, without departing from the scope of the disclosure. The term “and/or” includes a plurality of combinations of the associated items or any one of a plurality of associated items.

In the following detailed description, for convenience of illustration, numerous specific details are set forth in order to provide a thorough understanding of the disclosed embodiments. However, one or more embodiments may be embodied without these specific details. In other instances, well-known structures and devices are shown in schematic form in order to simplify the drawings.

FIG. 1 shows a perspective view of a connector according to an embodiment of the disclosure. The connector according to the disclosure includes a conductive terminal 10, an insulation body 20, and an engagement member 102. In one embodiment, the conductive terminal 10 may be a power terminal. However, the conductive terminal 10 may also be other types of terminals, such as a signal terminal, which is not limited in the disclosure. The conductive terminal 10 may be made of a conductive elastic material, for example, metal materials such as copper or copper alloy. The insulation body 20 may be made of insulation material such as plastic.

Figure 3:
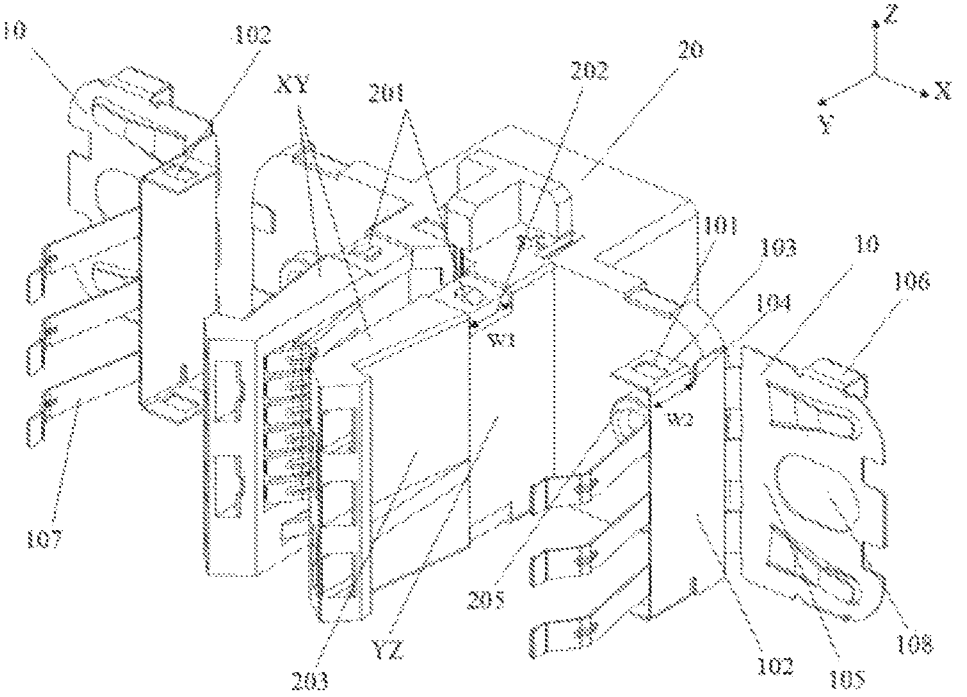
FIG. 3 is an exploded perspective view of the connector.

As best shown in FIGS. 1 and 3, the insulation body 20 extends in a first direction X, a second direction Y perpendicular to the first direction, and a third direction Z perpendicular to the first and second directions X, Y.

Figure 2:
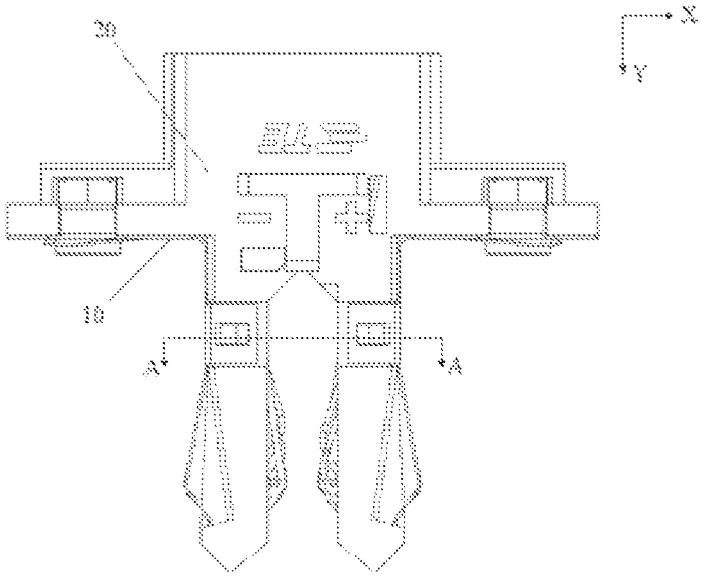
FIG. 2 is a top view of the connector.

The insulation body 20 includes two opposite first side surfaces XY and two opposite second side surfaces YZ, as shown in FIG. 3. In an embodiment, the first side surfaces XY are perpendicular to the second side surfaces YZ. The first and/or second side surfaces XY, YZ may be flat or curved, which is not limited in the disclosure. As shown in FIGS. 1 and 2, the conductive terminal 10 is supported on the first and second side surfaces XY, YZ, that is, both the first and second side surfaces XY, YZ are in contact with the conductive terminal 10.

The first side surface XY has a buckle protrusion 201 protruding in the third direction Z. The conductive terminal 10 includes a buckle opening 101 corresponding to the buckle protrusion 201, where the buckle opening 101 is configured to be interference fitted with the buckle protrusion 201 so that the conductive terminal 10 and the insulation body 20 are assembled together. In the shown embodiment, the first side surface XY has a recess, which has a depth in the third direction Z greater than or equal to a thickness of a wing 103 of the conductive terminal 10 in the third direction Z. The buckle protrusion 201 is disposed in the recess.

Figure 4:
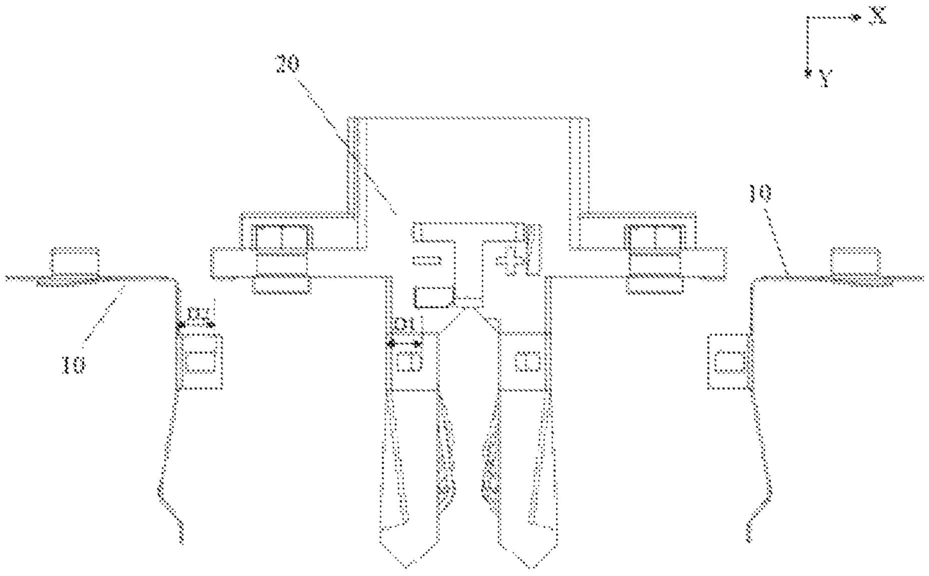
FIG. 4 is an exploded top view of the connector.

As shown in FIG. 4, a side surface of the buckle protrusion 201 away from the second side surface YZ is spaced apart by a first distance D1 from a plane where the second side surface YZ is located.

In an embodiment, a side surface of the buckle protrusion 201 close to the second side surface YZ is in the form of a ramp inclined from a top of the buckle protrusion 201 toward the first side surface XY, which facilitates an outer edge portion of the buckle opening 101 of the conductive terminal 10 to pass over the buckle protrusion 201, so that the buckle opening 101 and the buckle protrusion 201 are snap-fitted with each other. The buckle protrusion 201 may also be in the shape of a cube, a cylinder, a hemispheroid and the like, which is not limited in the disclosure. The cross-sectional area of the buckle protrusion 201 is less than that of the buckle opening 101 of the conductive terminal 10.

Figure 5:
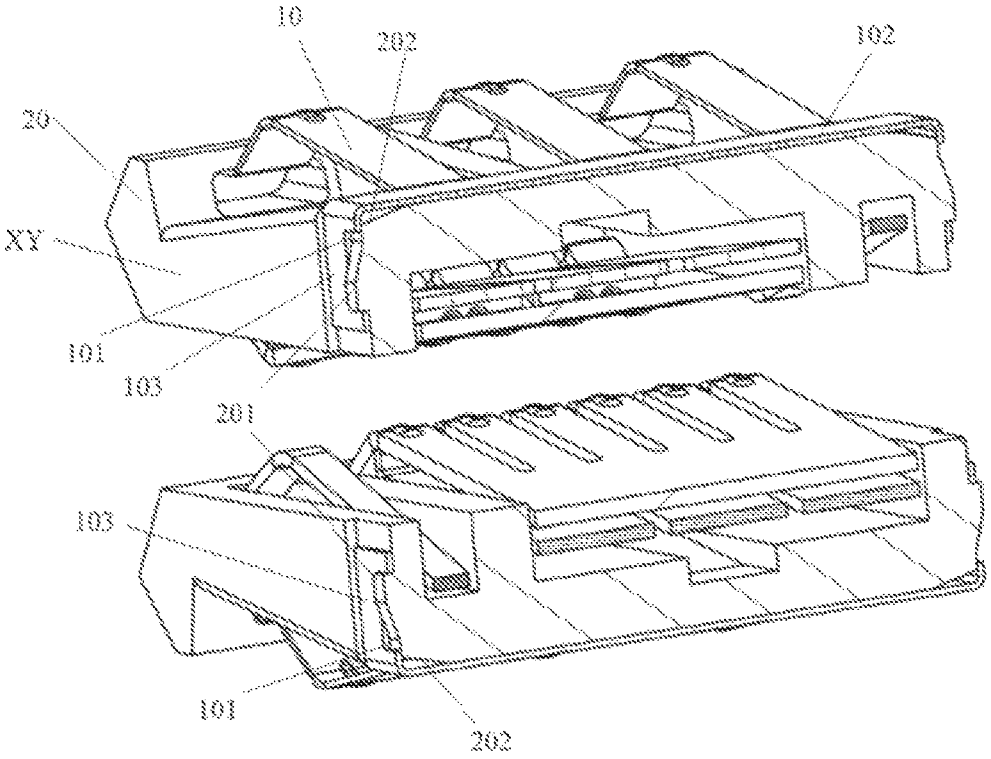
FIG. 5 is a sectional perspective view of the connector, taken along line A-A in FIG. 2.

The insulation body 20 has a notch portion 202, shown in FIGS. 3 and 5, and a bottom surface of the notch portion 202 is configured as a transition surface, or a ramp, between the first side surface XY and the second side surface YZ to connect with the first and second side surfaces respectively in a form of a non-right-angled corner. In other words, the notch portion 202 includes a bottom surface that is a transition surface between a portion of the first side surface XY and a portion of the second side surface YZ, and the bottom surface extends obliquely to the second side surface YZ from a plane where the first side surface XY is located, so that the bottom surface is oblique with respect to the plane where the first side surface XY is located and the plane where the second side surface YZ is located. As best shown in FIG. 5, a portion of the engagement member 102 between a main body and the wing 103 is spaced apart from the bottom surface of the notch portion 202 by a gap, after the engagement member 102 partially presses the conductive terminal 10 against the second side surface YZ. As shown in FIG. 3, the notch portion 202 has a first width W1 measured in the second direction Y.

The engagement member 102 may be made of an elastic material, and the engagement member 102 includes a main body and the wing 103 extending from the main body in a direction in which the main body faces the second side surface YZ. The buckle opening 101 is provided in the wing 103. In the shown embodiment, one engagement member 102 includes two wings 103; however, in other embodiments, the number of the wings 103 may be three, four and the like, which is not limited in the disclosure. In an embodiment, the wing 103 extends perpendicularly to the main body of the engagement member 102.

As shown in FIG. 4, an edge of the buckle opening 101 away from the main body of the engagement member 102 is spaced apart by a second distance D2 from the plane where a surface of the main body facing the second side surface YZ is located. The second distance D2 is less than or equal to the first distance D1 between the side surface of the buckle protrusion 201 away from the second side surface YZ and the plane where the second side surface YZ is located.

When the buckle opening 101 of the engagement member 102 is engaged with the buckle protrusion 201 of the insulation body 20, due to the existence of the notch portion 202, the buckle opening 101 is snap-fitted or buckle-fitted with the buckle protrusion 201, although the second distance D2 is less than the first distance D1. After the assembly is completed, by virtue of the elasticity of the engagement member 102, the outer edge of the buckle opening 101 and the side surface of the buckle protrusion 201 are tightly clamped together, so as to realize the interference fitting between the buckle opening 101 and the buckle protrusion 201. In this way, the portion of the conductive terminal 10 pressed against the insulation body 20 is not moveable relative to the insulation body 20. In other words, the engagement member 102 is in a tensioned state, after the buckle protrusion 201 is fitted into the buckle opening 101.

As shown in FIGS. 1 and 3, a portion of the engagement member 102 corresponding to the notch portion 202 (i.e., the portion of the engagement member 102 between the main body and the wing) has a second width W2 in the second direction Y, which is less than or equal to the first width W1. In the shown embodiment, the width of the wing 103 in the second direction Y is equal to the second width W2.

The engagement member 102 may be integral with the conductive terminal 10 so that the engagement member 102 is a part of the conductive terminal 10. In this case, the engagement member 102 is made of a conductive elastic material, for example, the same material as the conductive terminal 10. Alternatively, the engagement member 102 and the conductive terminal 10 may be separated components. When the conductive terminal 10 and the insulation body 20 are assembled together, the engagement member 102 may be firstly assembled with the conductive terminal 10. For example, the engagement member 102 may be coupled with the conductive terminal 10 by welding or by glue. However, in another embodiment, the engagement member 102 may not be coupled with the conductive terminal 10. In use, the conducting terminal 10 is arranged between the engagement member 102 and the insulation body 20 when the engagement member 102 is snap-fitted with the insulation body 20. In this case, the engagement member 102 may be made of a conductive elastic material, or the engagement member 102 may be made of an insulative elastic material.

In the shown embodiment, the insulation body 20 includes two connection portions 203, and the conductive terminal 10 is partially disposed on the outer side of the connection portion 203. Opposite inner side surfaces of the two connection portion 203 may be provided with other terminals, such as a signal terminal. The conductive terminal 10 may include at least one elastic arm 107, shown in FIG. 3, which is supported on the outer side surface of the connection portion 203.

In the shown embodiment, the insulation body 20 further includes two supporting portions 204, shown in FIG. 1, which are perpendicular to the first side surface XY and the second side surface YZ. Accordingly, the conductive terminal 10 further includes an engagement portion 105 having a fin 106, as shown in FIG. 3. The fin 106 is configured to hold the supporting portion 204 of the insulation body 20 so that the engagement portion 105 of the conductive terminal 10 is unmoveable relative to the insulation body 20 in the second direction Y and the third direction Z.

In the shown embodiment, a side surface of the supporting portion 204 facing the fin 106 is provided with a groove in which the fin 106 can be accommodated, so that the engagement portion 105 is not moveable relative to the supporting portion 204 in the first direction X. In an embodiment, the depth of the groove of the supporting portion 204 in the third direction is greater than or equal to the thickness of the fin 106.

The side of the supporting portion 204 facing the conductive terminal 10 includes a protruding portion 205, and the engagement portion 105 of the conductive terminal is provided with an opening 108. The opening of the engagement portion 105 is larger than the protruding portion 205 of the supporting portion 204, so that the protruding portion 205 of the supporting portion 204 may pass through the opening 108 of the engagement portion 105, as shown in FIG. 1, preventing the conductive terminal 10 from moving relative to the insulation body 20.

In the prior art, there are usually errors in manufacturing processes, so that a buckle opening and a buckle protrusion may not be perfectly aligned with each other during initial assembly, and thus resulting in a clearance fitting or a transition fitting formed between the buckle opening and the buckle protrusion.

According to the structures of the insulation body 20 and the conductive terminal 10 of the connector provided in the disclosure, especially by the notch portion 202 provided in the insulation body 20, an interference fitting between the buckle opening 101 and the buckle protrusion 201 can be achieved instead of the transition fitting or the clearance fitting there between in the existing design, so that the portion of the conductive terminal 10 contacting with the insulation body 20 is not moveable relative to the insulation body 20. Further, the contact height of the conductive terminal 10 upon being assembled depends on the conductive terminal 10 itself, but is not disturbed by the clearance fitting between the terminal 10 and the insulation body 20. Thus, the connector of the present disclosure does not require materials with too high mechanical properties, and also has a reduced size compared with the prior art.

Through the design of the disclosure, especially by the notch portion 202 provided in the insulation body 20, a slight bending of the engagement member 102 toward the insulation body 20 at the notch portion 202 enables the buckle opening 101 to move to be aligned with the opening protrusion, when the conductive terminal 10 is assembled onto the insulation body 20, even if the buckle opening 101 and the buckle protrusion 201 are initially misaligned with each other. Upon completion of the assembly, the buckle opening 101 and the buckle protrusion 201 are tightly clamped together to form an interference fitting. Through the interference fitting between the buckle protrusion 201 and the buckle opening 101, a portion of the conductive terminal 10 contacting the insulation body 20 is not moveable relative to the insulation body 20.

Although various embodiments of the disclosure have been shown and described, it will be understood by those skilled in the art that changes may be made to these embodiments without departing from the principles and spirit of the disclosure, the scope of which is defined by the appended claims and the equivalents thereof.

What is claimed is:

1. A connector, comprising:

an insulation body having a first side surface and a second side surface adjacent with each other at a corner, a buckle protrusion on the first side surface, and a notch portion at the corner, the insulation body has a bottom surface as a transition surface between a portion of the first side surface and a portion of the second side surface, the bottom surface extends obliquely to the second side surface from a plane of the first side surface, the bottom surface is oblique relative to the plane of the first side surface and a plane of the second side surface;

a conductive terminal partially pressed against the second side surface of the insulation body; and an engagement member having a main body and a wing, the main body is disposed on the second side surface, the wing extends from the main body in a first direction in which the main body faces the second side surface, the wing has a buckle opening interference fitted with the buckle protrusion, the engagement member presses the conductive terminal partially against the second side surface and the notch portion is covered by a portion of the engagement member between the main body and the wing.

2. The connector according to claim 1, wherein a side surface of the buckle protrusion away from the second side surface is spaced apart by a first distance from the plane of the second side surface, an edge of the buckle opening away from the main body of the engagement member is spaced apart by a second distance from a plane of the main body of the engagement member facing the second side surface, the second distance is less than or equal to the first distance.

3. The connector according to claim 1, wherein the notch portion has a first width measured in a second direction perpendicular to the first direction, the portion of the engagement member between the main body and the wing has a second width in the second direction, the second width is less than or equal to the first width.

4. The connector according to claim 1, wherein the engagement member is made of elastic material.

5. The connector according to claim 1, wherein the portion of the engagement member between the main body and the wing is spaced apart from the bottom surface of the notch portion by a gap after the engagement member partially presses the conductive terminal against the second side surface.

6. The connector according to claim 1, wherein the engagement member is integral with the conductive terminal.

7. The connector according to claim 1, wherein the engagement member is separated from the conductive terminal.

8. The connector according to claim 3, wherein the first side surface has a recess receiving the wing, a depth of the recess in a third direction perpendicular to the first and second directions is greater than or equal to a thickness of the wing of the conductive terminal in the third direction, the buckle protrusion is disposed in the recess.

9. The connector according to claim 1, wherein a side surface of the buckle protrusion close to the second side surface is in the form of a ramp inclined from a top of the buckle protrusion toward the first side surface.

10. The connector according to claim 8, wherein the insulation body has a pair of supporting portions each extending perpendicularly to the first side surface and the second side surface, the conductive terminal has an engagement portion with a fin holding one of the supporting portions of the insulation body, the engagement portion of the conductive terminal is unmoveable relative to the insulation body in the second direction and the third direction.

11. The connector according to claim 10, wherein the engagement portion has an opening, the supporting portion has a protruding portion fitted into the opening of the engagement portion.

12. The connector according to claim 2, wherein the portion of the engagement member between the main body and the wing is spaced apart from the bottom surface of the notch portion by a gap, after the engagement member partially presses the conductive terminal against the second side surface.

13. The connector according to claim 3, wherein the portion of the engagement member between the main body and the wing is spaced apart from the bottom surface of the notch portion by a gap after the engagement member partially presses the conductive terminal against the second side surface.

14. The connector according to claim 4, wherein the portion of the engagement member between the main body and the wing is spaced apart from the bottom surface of the notch portion by a gap after the engagement member partially presses the conductive terminal against the second side surface.

15. The connector according to claim 2, wherein the engagement member is integral with the conductive terminal.

16. The connector according to claim 2, wherein the engagement member is separated from the conductive terminal.

17. The connector according to claim 2, wherein the first side surface has a recess receiving the wing, a depth of the recess in a third direction perpendicular to the first direction and a second direction is greater than or equal to a thickness of the wing of the conductive terminal in the third direction, the buckle protrusion is provided in the recess.

18. The connector according to claim 2, wherein a side surface of the buckle protrusion close to the second side surface is in the form of a ramp inclined from a top of the buckle protrusion toward the first side surface.

19. The connector according to claim 2, wherein the insulation body has a pair of supporting portions each extending perpendicularly to the first side surface and the second side surface.

20. The connector according to claim 19, wherein the conductive terminal includes an engagement portion having a fin holding one of the supporting portions of the insulation body, an engagement portion of the conductive terminal is unmoveable relative to the insulation body in a second direction and a third direction perpendicular to the first direction.

* * * * *